United States Patent [19]

Cankovic et al.

[11] Patent Number: 5,039,137
[45] Date of Patent: Aug. 13, 1991

[54] SOIL PIPE COUPLING

[76] Inventors: Mitchell M. Cankovic, 1508-7374 Halifax Street, Burnaby, British Columbia V5A 1M5, Canada; Allan D. Cronk, 950 Greenwood Drive, West Vancouver, British Columbia V7S 1X7, Canada; Bernard P. Doyle, 10131 Park Drive, Surrey, British Columbia V3V 3A5, Canada

[21] Appl. No.: 579,108

[22] Filed: Sep. 5, 1990

Related U.S. Application Data

[63] Continuation of Ser. No. 237,317, Aug. 29, 1988, abandoned.

[30] Foreign Application Priority Data

Oct. 7, 1987 [CA] Canada ................................ 548929

[51] Int. Cl.[5] ............................................. A16L 21/00
[52] U.S. Cl. .................... 285/236; 285/177; 285/331; 285/351; 285/383; 285/423
[58] Field of Search ............... 285/236, 369, 331, 177, 285/383, 351, 423

[56] References Cited

U.S. PATENT DOCUMENTS

| 3,378,282 | 4/1968 | Demler, Sr. | 285/236 X |
|---|---|---|---|
| 3,479,066 | 11/1969 | Gittleman | 285/236 |
| 3,558,164 | 1/1971 | Havell | 285/236 |
| 3,682,503 | 8/1972 | Bloom | 285/369 X |
| 4,059,293 | 11/1977 | Sipler | 285/236 |
| 4,564,220 | 1/1986 | Sills et al. | 285/236 |

FOREIGN PATENT DOCUMENTS

| 935465 | 10/1973 | Canada | 285/236 |
|---|---|---|---|
| 2109566 | 9/1972 | Fed. Rep. of Germany | 285/236 |
| 643644 | 6/1984 | Switzerland | 285/236 |

Primary Examiner—Dave W. Arola
Attorney, Agent, or Firm—Fulwider Patton Lee & Utecht

[57] ABSTRACT

A soil pipe coupler. There is an annular portion formed from an elastomer having a hardness of 95 on the Shore Durometer A Scale. A ridge is formed about the portion's inner surface to be inserted between the ends of the two pipes to be coupled. A clamp means is included and clamping sleeves formed from an elastomer having a hardness of 95 on the Shore Durometer A Scale are formed integrally with the annular portion. The clamping sleeves extend axially from either side of the annular portion to overlap a length of each pipe to be joined. Each of the clamping sleeves is formed with an annular groove on the outer surface to position a clamp. The annular grooves have a ridge to support a clamp whereby the pipes to be coupled are inserted into the clamping sleeves until the pipe ends abut the ridge of the annular portion. The clamping means are tightened to shrink the clamping sleeves about the pipes to be coupled.

12 Claims, 3 Drawing Sheets

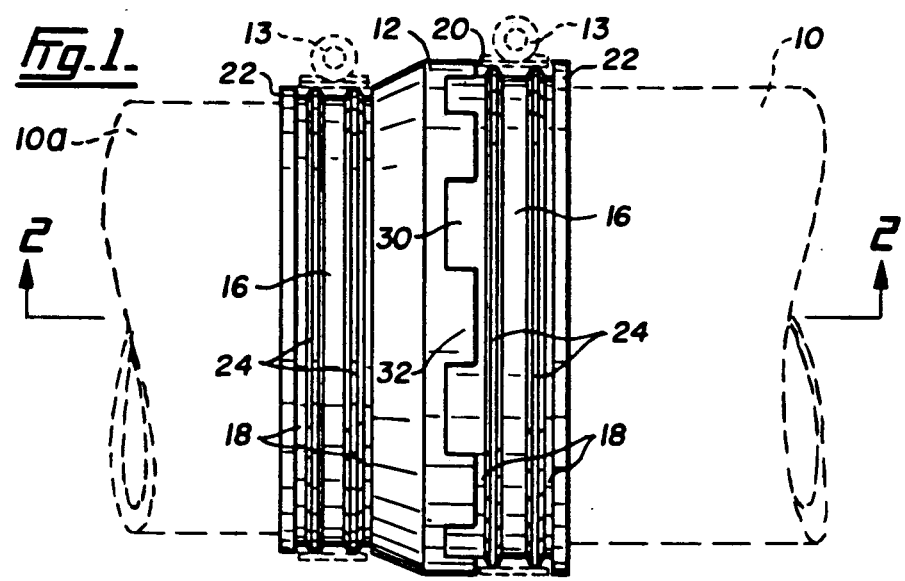
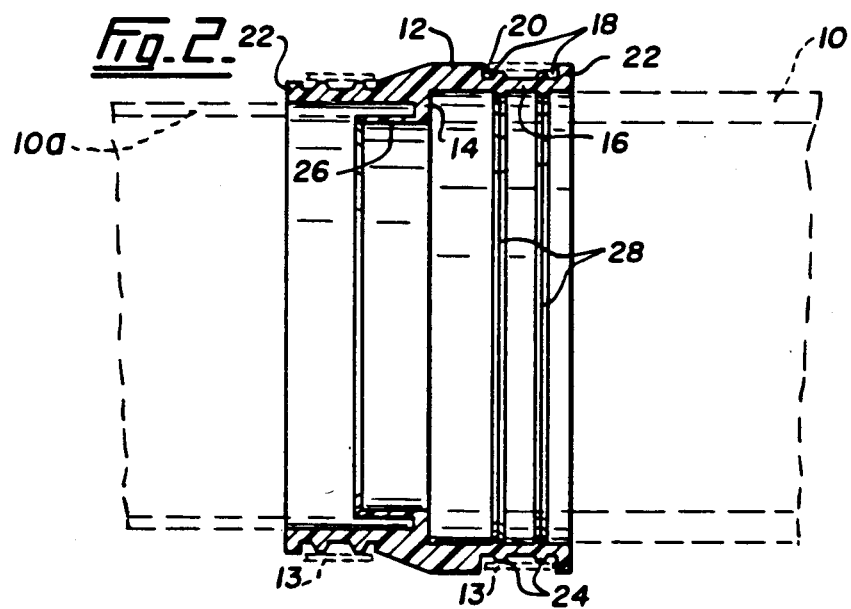
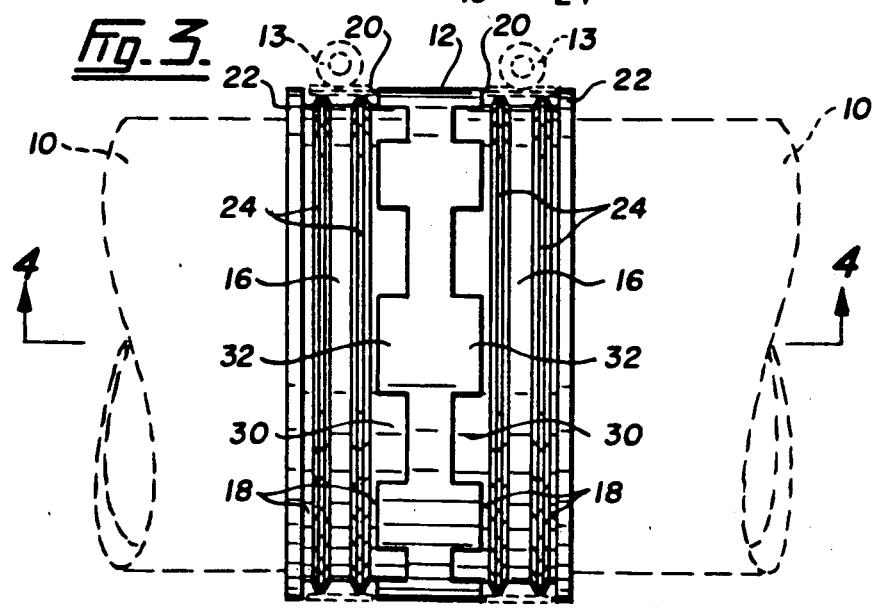

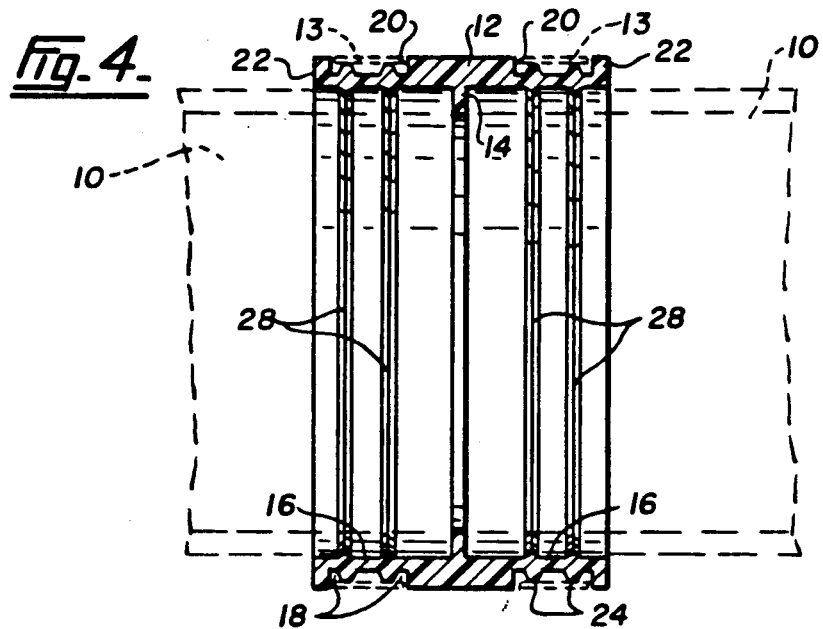
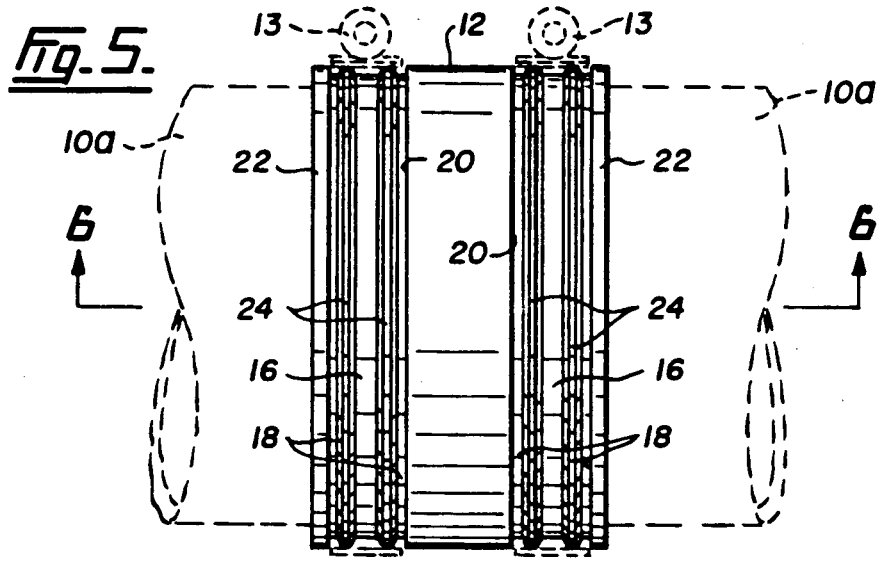
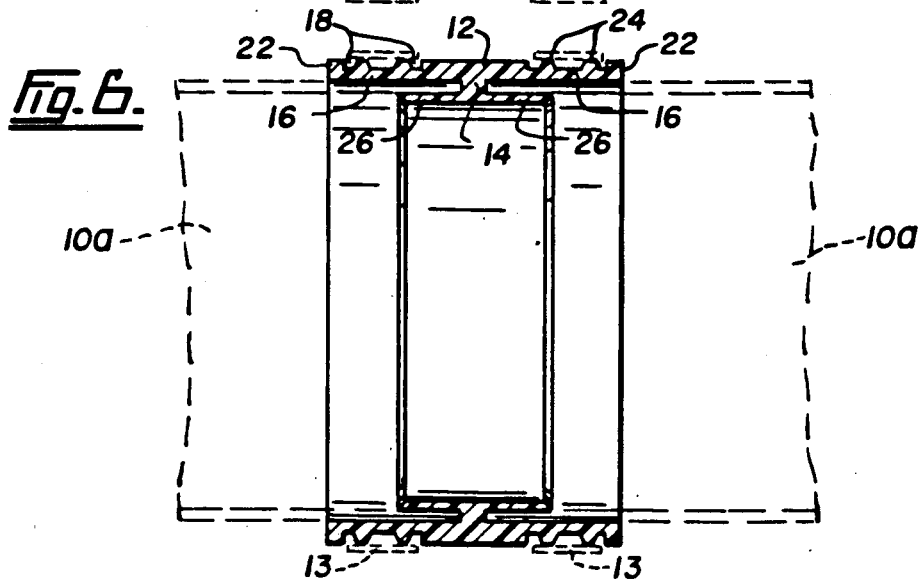

SOIL PIPE COUPLING

This is a continuation of copending application Ser. No. 237,317 filed on Aug. 29, 1988, now abandoned.

FIELD OF THE INVENTION

This invention relates to a soil pipe coupler.

BACKGROUND OF THE INVENTION

Hubless cast iron soil pipes and fittings were developed in the early 1960's and the pipes were connected using a stainless steel and elastomer construction as shown in the Canadian Government Specification Board 77-GP-2 of Dec. 8, 1961 and the Cast Iron Soil Pipe Institute (Washington, D.C.) Standard No. 301-64T in 1964. The design set out in the standards is still the predominant design used in hubless systems throughout North America.

An ideal soil pipe coupling has the following characteristics:
(a) Will not leak or deform unduly under test pressures;
(b) Resists angular deflections in the pipes to be joined, but allows some flexibility;
(c) Is strongly resistant to deformation due to lateral shear forces from pipe misalignment;
(d) Can resist pull-out forces due to internal test pressures;
(e) Has a long service life;
(f) Is easy to assembly and install;
(g) Holds the pipes in a concentric alignment; and
(h) Is economical in use and is cost effective.

The soil pipe coupling set outin the standards and in common use today has consistently out-performed all others in generally fulfilling the above requirements.

The soil pipe couplings commonly used comprise, in general, three main elements. First, there is a sealing element, made of relatively soft, resilient elastomer of hardness 35 to 70 on the Shore Durometer A Scale. The sealing element is tubular and is normally stretched over the two pieces to be joined to form a leak-proof joint when clamped. Secondly, a corrugated shear ring, usually of stainless steel is clamped over the sealing element and provides the strength to resist deformation due to shear forces which would otherwise offset pipes or fittings at the joint, producing increased flow resistance inside the pipe. Thirdly, clamping means apply the necessary pressure to the sealing element to make the joint leak-proof and supply rigidity to the coupling when applied in conjunction with the shear ring. These clamping means are normally in the form of stainless steel hose clamps but cast iron segments bolted together with stainless steel bolts are also used.

Both the United States and Canadian Standards allow the outside diameter of cast iron pipe and fittings to vary approximately ¼ inch. The original coupling designs, which are still in use, use a thin elastomeric gasket which is sized so that it will slip over the minimum diameter. This gasket must be stretched over any other diameter and thus is normally under tension when applied to a pipe or fitting. On maximum diameters or during cold weather, when the elastomeric gasket becomes very stiff it can be difficult to assemble a joint. It is often necessary to heat the gasket so that it can be stretched over the pipe end.

Because the gasket must be stretched over the pipes to be joined, it is necessary to separate the clamping means from the gasket and then to apply the neoprene gasket separately. The clamping means must then be applied over the gasket. Thus two items must be separately applied to complete a sealed joint. This adds considerably to the time and effort required to assemble a joint.

Because the hose clamps are rivetted or welded to the corrugated shield, the clamping means are essentially one piece. To achieve a satisfactory joint, the clamps on either side of the joint must be progressively tightened, alternating on each side until the hose clamps reach their proper tension. Because of this procedure, in practice it is impossible to connect this coupler to one pipe and then complete the connection to the next element in the plumbing system at a later time. Subassembling is thus inhibited.

Furthermore, when connecting two pipes or fittings of different diameters, this coupling will cause one side of the matching parts to align. So that all the difference in diameter occurs on the opposite side, that is the joint is not concentric. This can result in dams and other flow impediments.

The shortcomings outlined above are present in the standard couplings used today.

SUMMARY OF THE INVENTION

The present invention seeks to overcome the above disadvantages of the standard coupling and to do so in a way that is more cost effective. The present invention also is able to perform as well as the present couplings.

Accordingly, the present invention is a soil pipe coupler comprising:
an annular portion formed from an elastomer having a hardness of 95 on the Shore Durometer A Scale; a ridge formed about the inner surface of the annular portion to be inserted between the ends of the two pipes to be coupled;
clamping means;
clamping sleeves formed from an elastomer having a hardness of 95 on the Shore Durometer A Scale and formed integrally with the annular portion, said clamping sleeves extending axially from either side of the annular portion so as to overlap a length of each pipe to be joined, each of said clamping sleeves being formed with an annular groove on the outer surface to position the clamping means, the annular grooves having a ridge to support the clamping means, whereby the pipes to be coupled are inserted into the clamping sleeves until the pipe ends abut the ridge of the annular portion, the clamping means being tightened to shrink the clamping sleeves about the pipes to be coupled.

In a preferred embodiment there are a pair of spaced, parallel ridges in each annular groove of the clamping sleeves.

Furthermore, where, in the case of cast iron pipes, the outer surface of the pipe is rough it is desirable to provide a pair of spaced parallel ridges directly opposite the pair of spaced parallel ridges formed in the annular grooves.

In a particularly preferred embodiment the elastomer is vulcanisate of an olefin rubber and a polyolefin resin, the olefin rubber being completely cured. These compounds are described and claimed, for example, in the U.S. Pat. No. 4,130,535, Dec. 19, 1978 to Coran et al. A particularly useful compound is available under the trademark Santoprene from Monsanto.

BRIEF DESCRIPTION OF THE DRAWINGS

Aspects of the invention are illustrated, merely by way of example, in the accompanying drawings in which:

FIG. 1 is a side elevation of a coupling according to the present invention;

FIG. 2 is a section through the coupling of FIG. 1 taken along line 2—2;

FIG. 3 is a side elevation of a further embodiment of the invention;

FIG. 4 is a section through the coupling of FIG. 3 taken along line 4—4;

FIG. 5 is a side elevation of a further embodiment of the invention;

FIG. 6 is a section through the coupling of FIG. 5 taken along line 6—6;

DESCRIPTION OF THE PREFERRED EMBODIMENTS

Figure 7:
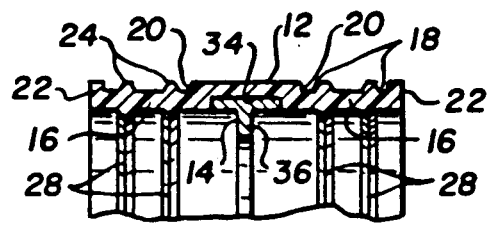
FIG. 7 is a partial section illustrating a preferred feature of the invention.

The drawings show various embodiments of a soil pipe coupler for a pair of conventional soil pipes. It should be noted that FIGS. 1 and 2 illustrates a coupler to be used to attach an aluminum pipe 10a to a cast iron soil pipe 10. the cast iron pipe being of larger diameter than the aluminum pipe. FIGS. 3 and 4 show a coupler to be used to attach a cast iron pipe to a cast iron pipe and FIGS. 5 and 6 illustrate a coupler useful to join an aluminum pipe to an aluminum pipe.

Each of the various embodiments is a soil pipe coupler comprising an annular portion 12 formed from an elastomer having a hardness of 95 on the Shore Durometer A Scale. There is a ridge 14 formed about the inner surface of portion 12 to be inserted between the ends of the two pipes 10 to be coupled. There are clamping means in the form of conventional clamping bands or hose clips 13 mounted about clamping sleeves 16 formed integrally with the annular portion 12. Typically sleeves 16 will be made of the same material as the portion 12. The clamping sleeves 16 extend axially from each end of the annular portion 12 to overlap a length of each pipe 10 to be joined. Each of the clamping sleeves 16 is formed with an annular groove 18 on the outer surface defined by inner wall 20 and outer wall 22, to position the clips 13. The annular grooves 18 have one or more ridges 24 to support the clips 13. Generally, two ridges 24 are formed parallel to each other.

In the embodiments shown in FIGS. 2, 4, 7 and 8, there are a pair of spaced, parallel ridges 28 in the inner surface of the clamping sleeves 16. These inner parallel ridges 28 are directly opposite the spaced, parallel ridges 24 on the outer surface of the sleeve 16. These ridges 28 are necessary if the outer pipe surface is rough or uneven as in cast iron soil pipe.

In the illustrated embodiments of FIGS. 1 and 2 and FIGS. 3 and 4, which involve making a connection with a cast iron pipe, the inner wall 20 is formed with inlets 30 to facilitate distortion or change of shape of the sleeves 16 while maintaining as far as possible the shape of the annular portion 12. The inlets 30 form fingers 32 extending axially along the coupling.

Typically these inlets 30 and fingers 32 are formed in that part of the coupler that receives the cast iron pipe, that is, having the larger external diameter.

The embodiments of FIGS. 1 and 2 and 5 and 6 show axially extending surfaces 26 at the inner end of the ridge 14. Surfaces 26 create circumferential channels between the surface and the main body of the soil pipe coupler to help to seal the end of the pipe. These channels are preferred in that part of the coupler that receives the aluminum soil pipe. This arrangement is described in U.S. Pat. No. 4,538,837 and its Canadian counterpart 1,176,282.

FIG. 7 shows an inner recess 34 on the annular portions inner surface. The recess 34 receives a generally T-shaped insert 36 formed of a non-combustible material. The cross piece of the T resides in the recess 34 and the limb of the T forms the ridge 14 about the portion's inner surface. In case of fire, insert 36 will maintain the physical continuity of the piping system and will minimize flame propagation through the pipe joint.

Figure 8:
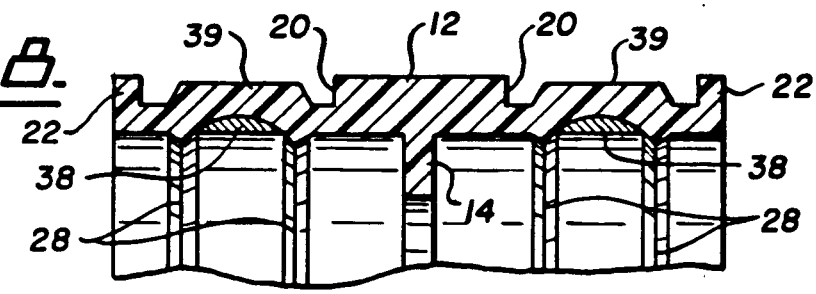
FIG. 8 is a partial section illustrating a further embodiment of the present invention.

FIG. 8 shows a preferred configuration of the present invention for use when it is necessary to apply a mastic sealant to the outside surface of the pipe at the pipe joint.

In this case, grooves 18 are bridged over to form one large rib 39. An annular recess 38 is formed on the inner surface of the gasket to supply the necessary clearance over the pipe surface to ensure that the clip pressure will be applied only to inner ridges 28. A suitable mastic can be inserted into groove 38 prior to fitting the coupling over the pipe ends. The mastic will fill the space between ridges 28 when the clip 13 is tightened thereby trapping the mastic in an annular space defined by ridges 28 and sealing the joint against leakage.

Figure 9:
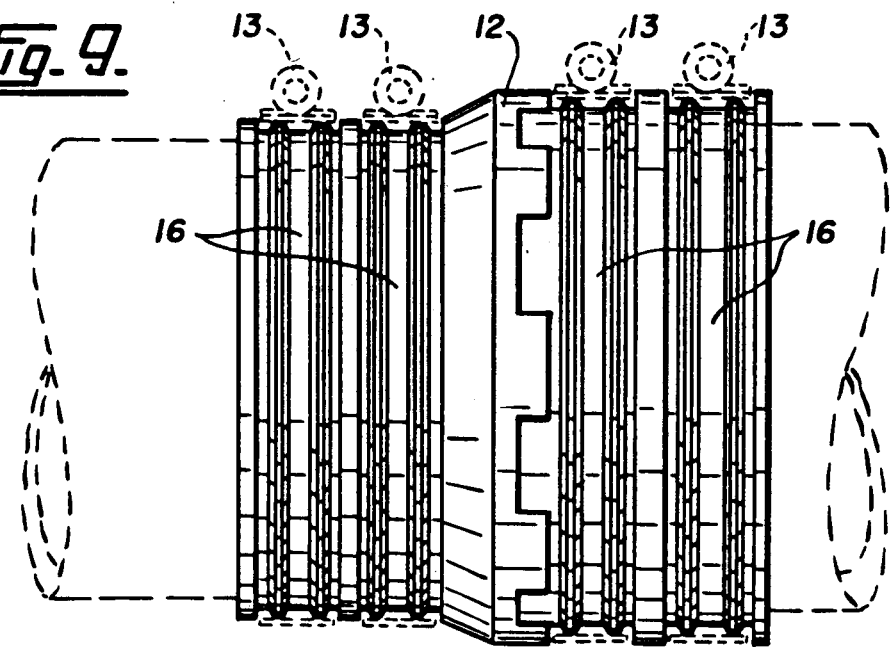
FIG. 9 is a further embodiment of the invention for use with large diameter pipes.

FIG. 9 shows a further embodiment of the present invention for use with larger diameter pipes. Clamping sleeves 16 are extended to increase the overlap of the coupler, and additional grooves 18 are formed in each sleeve to mount a second set of clamping members 13. As required, grooves 18 may be formed with ridges 24.

The illustrated couplings have been shown, in tests, to overcome the shortcomings of the prior art couplings and to do so in a cost effective manner.

The illustrated coupling can combine the sealing element with a shear ring using a single material. The normal elastomers used in sealing elements to date are too soft to provide sufficient shear resistance, even when appreciably thickened to increase its strength. The elastomeric component of the present invention is made of a much harder elastomer, having a hardness of 95 on the Shore Durometer A Scale. This material provides adequate resistance to shear without unduly increasing the physical dimensions of the coupling. A property of this elastomer is that it is too inelastic to stretch in the assembly procedure. Thus the present invention incorporates structural features that enables the coupling to be slipped easily over the maximum diameter and yet can be compressed without wrinkles or laps when it is drawn down over the minimum diameter to make the seal.

The present invention is applied as a complete unit consisting of 2 clamping members mounted about the body of the coupling. These clamping members are not removed or separated during the assembly procedure. The clamps can, however, be rotated independently about the elastomer body by the installer to facilitate easy assembly. The unit is made to freely slip over the pipe ends to be joined. All that is required is to position the coupler over one or both ends of the pipe ends 10 to be joined. The coupler is slid on to the pipe or pipes 10 until the pipes abut the ridge 14 about the interior of the central annular portion. Clips 13 are then tightened to locate the coupler in position and, in particular, to form a sealed joint between the two pipes.

In contributing to the seal, the ridge 14 enters between the pipes separating the units to be connected, locating the coupling over the ends of the pipes and adding to the rigidity of the central core of the coupler. The relatively rigid central core allows either side of the coupling to be applied and tightened to a pipe, regardless of its size within the allowable tolerance, without distorting or changing the physical dimensions of the opposite side of the coupler. This allows the coupling to be completely fixed to one pipe prior to completing the joint, thereby allowing the subassembly of piping.

The fingers 32 are of sufficient strength that when deformed to fit the outside diameter of the pipe or fitting, the elastomer will form a conical configuration to align the joint pipes and maintain that alignment, and to provide shear resistance to inhibit the lateral displacement of one pipe with respect to the other.

The maximum allowable variation between acceptable cast iron pipes and fittings is approximately ¼ inch. Thus elastomer under the hose clips may be forced to contract by ¼×or 0.785 inches on the circumference. If this shrinkage takes place at one location leaks will develop along the seams or overlap and the joint would not be concentric. The present invention uses the system of multiple fingers 32, connected by a non-structural elastomeric diaphragm, to maintain continuity and to ensure that the joint remains leak proof. Shrinkage will then take place in the relatively thin diaphragm sections and be evenly divided around the circumference of the coupling.

Outer walls 22 of groove 18 provide added resistance to buckling or wrinkling of the diaphragm and act as a retainer to hold the clip 13 in position.

The bottom of the groove 18 is a thin section of elastomer yet thick enough that when the constricting force of the hose clip is applied it will not buckle or otherwise shrink making grooves next to the metal pipe, which would allow leakage past the interface.

The construction of the standard hose clip used to apply the constricting forces produces some discontinuity under the screw housing of the hose clip. Next to the screw housing is the step which equals the band thickness at overlap. When this hose clip is applied over the resilient gasket used in the standard coupling, the elastomer, because it is soft, flows into the discontinuities of the clip and effectively fills the space between the clip and the pipe. This allows the clip to apply an even and equal pressure to all parts of the sealing surfaces. However, when the hose clip is applied over a simple gasket of the elastomer used in the present invention and tightened to required torque, leaks develop at points where the hose clamp does not contact the gasket. This is because the gasket material used in the coupling of the present invention is too inelastic to flow into the configuration at the overlap and at the discontinuous surfaces. At these points the clip pressure is not applied to the gasket, leaving channels across the pressure surface of the clip where wrinkles in the gasket can form. This allows liquid to flow through the seal.

It is therefore necessary to apply the hose clip to a more resilient layer into which it will imbed in order to evenly transmit the pressure to the gasket layer beneath it. This could be accomplished by placing a layer of more resilient elastomer over the gasket according to the present invention, between the clip and the gasket but this adds to the cost and the complexity of the product. A centrally located rib 24 on the external surface of the groove 18 provides the necessary capability. The rib 24 is approximately 20% of the slot width and twice the thickness of the clip 13. The rib 24 is, of course, integral with the coupling and of the same material. When the clip is applied the reduced pressure area increases the unit pressure applied and the elastomer deforms and flows into the discontinuities of the clip. Pressure is then applied through the rib 24 to the body of the gasket and is transmitted evenly to the gasket-pipe interface, completely sealing the joint. When a standard hose clip is used the screw slots in the band next to the screw housing will press on the rib 24 with increased pressure. This can cause the elastomer to extrude into the slots and lock the coupler to that portion of the clamp that is being drawn into the housing. This causes a bunching effect to occur under the clip overlap and reduces the sealing ability of the unit. The bunching effect can also cause misalignment of the pipes. This problem can be avoided by extending this clip band past the screw housing such a distance as to cover the screw slots in the other end of the clamping band. The joint will seal without the extension to the clamping band but performance will be improved with this change.

However, the preferred solution is the use of two ridges 24 in place of a single ridge. The two ridges 24 are spaced so as to straddle the screw slot, then the slots will not lock onto the ribs when the clip is applied. Typically these ribs 24 should be half the width of the single ridge but of the same thickness. This is particularly preferred as standard hose clips can be used and the pressure will be more evenly applied to effect the liquid seal. The center lines of the connected pipe or fitting will also be more nearly in alignment because the bunching tendency will be eliminated.

Furthermore, in addition to acting as cushioning ribs the ridges will concentrate the clamp tightening forces directly under the ridges of the gasket pipe interface. This increases the sealing ability of the coupler to the metal surface.

If the surface of the pipe or fitting is rough, as for example with cast iron pipe, the tightening pressure under the ribs may be distributed over an area which is so large that the unit loading on the pipe surface will not be large enough to force the elastomer into the surface irregularities. It is to reduce this problem that the internal ridges 28 are formed.

The present invention provides a simplified soil pipe coupling that equals the performance of the present coupling in service.

The design of the present invention incorporates the required properties of a metallic shield and an elastomeric gasket into a single, easily produced elastomeric gasket, thus it can be produced at a considerable cost saving.

The slip-on feature of the present invention allows the coupling to be applied as a single unit without the required stretching of the prior art coupler. In addition, either end of the present invention can be independently attached without affecting the performance of the other end, allowing for sub-assembly. Thus considerable savings in assembly time can be achieved.

We claim:

1. An unshielded soil pipe coupler comprising:
   an annular portion formed from an elastomer having a suitable hardness;
   a ridge formed about the inner surface of the annular portion to separate the ends of two pipes to be coupled;
   clamping means;
   a clamping sleeve of an elastomer having a suitable hardness and formed integrally with the annular portion, said clamping sleeves extending axially from either side of the annular portion to overlap a length of each pipe to be joined, each said clamping sleeves being formed with an annular groove to receive clamping means and defined, in part, by an outwardly projecting ridge to confine the outer edge of the clamping means;
   at least one outwardly projecting continuous circumferential ridge formed in the annular groove to separate the clamping means from the clamping sleeve and to stiffen the clamping sleeve;
   axially extending inlets extending from at least one side toward the other side in the outer surfaces of the annular portion forming a plurality of equally spaced fingers of a suitable hardness to facilitate a change of shape of the clamping sleeves;
   whereby the pipes to be coupled may be inserted into the clamping sleeve until the pipe ends abut the ridge of the annular portion, the clamping means being tightened to bend the fingers and shrink the clamping sleeves about the pipes to be coupled.

2. An unshielded soil pipe coupler as claimed in claim 1 in which said clamping means is a pair of hose clips.

3. An unshielded soil pipe coupler as claimed in claim 1 in which said clamping sleeves are extended so that each of said clamping sleeves is formed with an additional groove having a ridge to support clamping means to allow additional clamping means to be used with the coupler when the coupler is used to join larger diameter pipes.

4. An unshielded soil pipe coupler as claimed in claim 1 in which the inner surface of each clamping sleeve is formed with at least one ridge directly opposite and parallel to the ridge formed in the annular groove on the outer surface of the clamping sleeve, said ridge engaging the outer surface of the pipes to be coupled when the clamping means are tightened to ensure a good seal on a rough surface.

5. An unshielded soil pipe coupler as claimed in claim 4 in which each said annular groove contains two of said ridges which are parallel to each other and the inner surface of each clamping sleeve is formed with a pair of spaced parallel ridges directly opposite said pair of spaced parallel ridges formed in the annular grooves on the outer surface of the clamping sleeves, said ridges engaging the outer surface of the pipes to be coupled when said clamping means are tightened to ensure a good seal against the inserted pipes.

6. An unshielded soil pipe coupler as claimed in claim 1 having at least one axially extending surface at the inner surface of said inwardly extending ridge to create a circular channel between said surface and the main body of the soil pipe coupler to accept and seal the end of the pipe.

7. An unshielded soil pipe coupler as claimed in claim 1 in which the ridge formed about the inner surface of the annular portion is formed as a non-combustible insert.

8. An unshielded soil pipe coupler as claimed in claim 7 in which there is an inner recess in the inner surface of the annular portion, the insert being generally T-shaped with the cross piece of the T received in the recess and the limb of the T forming the ridge.

9. An unshielded soil pipe coupler as claimed in claim 1 made of a vulcanisate of an olefin rubber and a polyolefin resin, the olefin rubber being completely cured.

10. An unshielded soil pipe coupler as claimed in claim 9 in which the rubber is EPDM, being a copolymer of ethylene, propylene and an on-conjugated diene.

11. An unshielded soil pipe coupler as claimed in claim 9 in which the polyolefin is polypropylene.

12. An unshielded soil pipe coupler as claimed in claim 1 in which the inner surface of each clamping sleeve is formed with a pair of spaced parallel ridges which define a space for housing a sealing compound, said ridges engaging the outer surface of the pipes to be coupled when the clamping means are tightened, thereby compressing the sealing compound against the pipes to be coupled to assist in forming a leakproof seal.

* * * * *